US006555888B2

(12) United States Patent
Lepert et al.

(10) Patent No.: US 6,555,888 B2
(45) Date of Patent: Apr. 29, 2003

(54) ELECTROSTATIC DISCHARGE PROTECTION FOR SENSORS

(75) Inventors: Arnaud Yves Lepert, Lafayette, CA (US); Danielle A. Thomas, Dallas, TX (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 10/186,801

(22) Filed: Jul. 1, 2002

(65) Prior Publication Data

US 2002/0164862 A1 Nov. 7, 2002

Related U.S. Application Data

(62) Division of application No. 09/223,629, filed on Dec. 30, 1998, now Pat. No. 6,440,814.

(51) Int. Cl.[7] .............................................. H01L 29/82
(52) U.S. Cl. ......................... 257/415; 341/33; 382/124; 361/283.1
(58) Field of Search ................................. 257/222, 225, 257/226, 232–4, 252, 277, 306, 415–18, 457–8, 487–8, 340, 532, 600, 632; 438/250–54, 393–7, 238; 369/126; 361/283–1; 341/33; 382/124; 324/661–2, 671

(56) References Cited

U.S. PATENT DOCUMENTS

| | | | |
|---|---|---|---|
| 3,921,167 A | 11/1975 | Fox | 340/365 |
| 3,974,332 A | 8/1976 | Abe et al. | 178/18 |
| 4,194,083 A | 3/1980 | Abe et al. | 178/18 |
| 4,290,052 A | 9/1981 | Eichelberger et al. | 340/365 |
| 4,353,056 A | 10/1982 | Tsikos | 340/146 |
| 4,394,773 A | 7/1983 | Ruell | 382/4 |
| 4,766,474 A | 8/1988 | Nakagawa et al. | 357/23.8 |
| 5,325,442 A | 6/1994 | Knapp | 382/4 |

(List continued on next page.)

FOREIGN PATENT DOCUMENTS

| | | |
|---|---|---|
| EP | 0 790 479 A1 | 8/1997 |
| JP | 4-25200 | 1/1992 |
| WO | WO 94/05042 | 3/1994 |
| WO | WO 98/52147 | 11/1998 |

OTHER PUBLICATIONS

Tartagni, et al., "A 390 dpi Live Fingerprint Imager Based on Feedback Capacitive Sensing Scheme," 1997 IEEE International Solid–State Circuits Conference, 1997.

R.F. Wolffenbuttel and P.O.L. Regtien, "Integrated Tactile Imager with an Intrinsic Contour Detection Option," *Sensor and Actuators,* Jan./Feb. 1989, No. 1/2, pp. 141–153.

N.D. Young, et al., "Novel Fingerprint Scanning Arrays Using Polysilicon TFT's on Glass and Polymer Substrates," IEEE Electron Device Letters, v. 18, No. 1, Jan. 1997, pp. 19–20.

Marco Tartagni and Roberto Guerrieri, "A Fingerprint Sensor Based on the Feedback Capacitive Sensing Scheme," Jan. 1998, IEEE Journal of Solid State Circuits, vol. 33, No. 1, pp. 133–142.

S.M. Sze, "Physics of Semiconductor Devices," 1983, John Wiley & Sons, Central Book Company, Taipei, Taiwan, pp.30–33.

*Primary Examiner*—Long Pham
*Assistant Examiner*—Ginette Peralta
(74) *Attorney, Agent, or Firm*—Lisa K. Jorgenson; William A Munck

(57) ABSTRACT

A structure and method is disclosed for dissipating electrostatic charges comprising an underlying dielectric layer disposed over capacitor plates of sensor circuitry, and a conductive layer and passivation layers disposed over the underlying dielectric layer wherein the conductive layer diffuses electrostatic charges at the surface of the integrated circuit.

20 Claims, 2 Drawing Sheets

U.S. PATENT DOCUMENTS

| | | | |
|---|---|---|---|
| 5,331,580 A | 7/1994 | Miller et al. | 364/708.1 |
| 5,463,388 A | 10/1995 | Boie et al. | 341/33 |
| 5,514,612 A | 5/1996 | Rao et al. | 437/51 |
| 5,648,642 A | 7/1997 | Miller et al. | 178/18 |
| 5,778,089 A * | 7/1998 | Borza | 382/124 |
| 5,847,690 A | 12/1998 | Boie et al. | 345/104 |
| 5,862,248 A | 1/1999 | Salatino et al. | 382/124 |
| 5,907,627 A | 5/1999 | Borza | 382/124 |
| 5,963,679 A * | 10/1999 | Setlak | 382/312 |
| 6,008,081 A | 12/1999 | Wu | 438/210 |
| 6,088,471 A * | 7/2000 | Setlak et al. | 382/124 |
| 6,091,082 A | 7/2000 | Thomas et al. | 257/77 |
| 6,091,132 A * | 7/2000 | Bryant | 257/632 |
| 6,114,862 A | 9/2000 | Tartagni et al. | 324/662 |
| 6,163,313 A | 12/2000 | Aroyan et al. | 345/173 |
| 6,180,989 B1 | 1/2001 | Bryant et al. | 257/414 |
| 6,208,009 B1 | 3/2001 | Kravtchenko et al. | 257/533 |

* cited by examiner

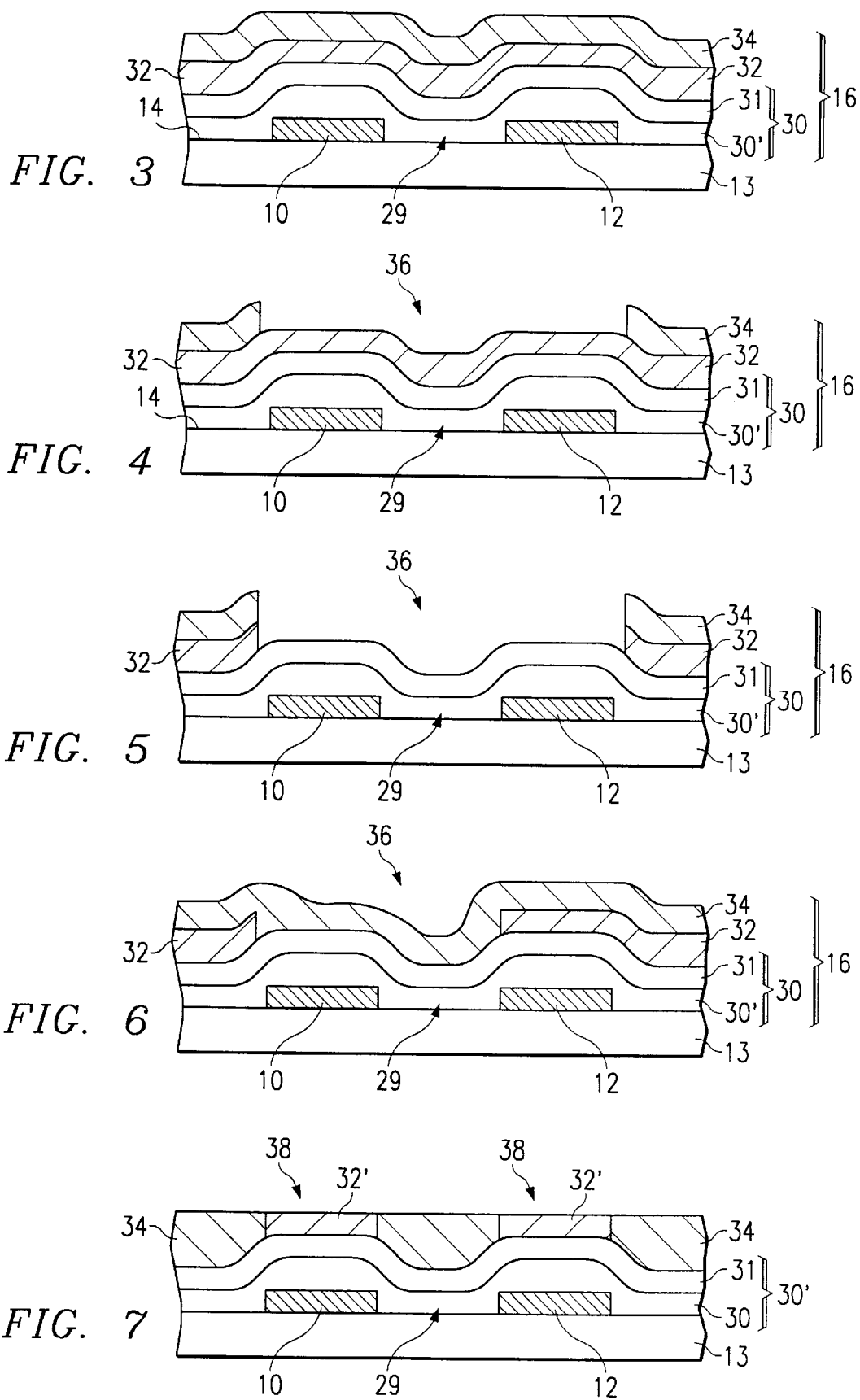

ELECTROSTATIC DISCHARGE PROTECTION FOR SENSORS

CROSS REFERENCE TO A RELATED APPLICATION

This application claims priority as a divisional of U.S. patent application Ser. No. 09/223,629 filed Dec. 30, 1998, now U.S. Pat. No. 6,440,814. The following related patent applications each showing a type of electrostatic discharge protection method and apparatus, are incorporated herein by reference and with which the present invention fined utility: U.S. patent application Ser. No. 08/927,450, filed Sep. 11, 1997 and titled ELECTROSTATIC DISCHARGE PROTECTION OF A CAPACITIVE TYPE FINGERPRINT SENSING ARRAY; U.S. patent application Ser. No. 09/144,182, filed Aug. 31, 1998, and titled SELECTIVELY DOPED ELECTROSTATIC DISCHARGE LAYER FOR AN INTEGRATED CIRCUIT SENSOR, now U.S. Pat. No. 6,180,989; U.S. patent application Ser. No. 09/224,812, filed Dec. 30, 1998, and titled STATIC CHARGE DISSIPATION FOR AN ACTIVE CIRCUIT SURFACE; U.S. patent application Ser. No. 09/223,706, filed Dec. 30, 1998, and titled STATIC CHARGE DISSIPATION PADS FOR SENSORS, now U.S. Pat. No. 6,346,739; U.S. patent application Ser. No. 09/223,346, filed Dec. 30, 1998, and titled APPARATUS AND METHOD FOR CONTACTING A SENSOR CONDUCTIVE LAYER, now U.S. Pat. No. 6,330,145; U.S. patent application Ser. No. 09/224,815, filed Dec. 30, 1998, and titled APPARATUS AND METHOD FOR CONTACTING A CONDUCTIVE LAYER; U.S. patent application Ser. No. 09/223,707, filed Dec. 30, 1998, and titled TOPOGRAPHICAL ELECTROSTATIC PROTECTION GRID FOR SENSORS, now U.S. Pat. No. 6,326,227.

TECHNICAL FIELD OF THE INVENTION

The present invention relates in general to the field of static discharge dissipation, and more particularly, to a structure and method for protecting a sensor device from electrostatic discharge damage while maintaining enough sensitivity to capture sensor data.

BACKGROUND

Without limiting the scope of the invention, its background is described in connection with the protection of integrated circuit fingerprint sensors from the environment during regular use, as an example.

Heretofore, in this field, the detection of fingerprint patterns, composed of lines or ridges and valleys, has been useful for the identification of specific individuals based on the observation that each individual person has a unique fingerprint. Fingerprints, therefore, can be used not only to positively identify individuals, but to exclude individuals whose fingerprint profile does not match a pre-existing set of patterns.

Fingerprint sensing has evolved from optical and mechanical sensing technologies that acquire a fingerprint image. In those systems, generally, the mechanical and optical sensors obtain a fingerprint image using a scanner or a camera, process the acquired information into an analog or digital signal that can be analyzed, and provide an output based on the acquired signal. Unfortunately, the lighting and contrast conditions available at the time the image is acquired affects the analysis of the acquired data and consequently affects the sensor output. Furthermore, image capture systems are easily tricked using false images. In addition, conventional optical sensors usually require bulky optics, making these types of sensors impractical for portable systems.

Another class of fingerprint sensors are capacitive sensors, such as that disclosed in U.S. Pat. No. 4,353,056 issued to Tsikos. The Tsikos patent demonstrates the use of a sensor that incorporates a sensing member that has a sensing surface for receiving a fingerprint. The sensing surface has a means for sensing the ridges and valleys of the skin of the finger under observation. The sensing member contains a multitude of capacitors that sense the patterns of the fingerprint when the finger is pressed against the sensing surface. The information obtained by the sensing member is transformed into an electric signal. The capacitors are insulated from the environment of use by a flexible membrane that conforms itself to the contour of the fingerprint. Unfortunately, the repeated cycles of flexing and compression of the flexible membrane can lead to device failure and the need to replace the membrane.

U.S. Pat. No. 4,385,831 issued to Ruell, et al., discloses a fingerprint sensor that provides an electrical output signal in response to the topography of the fingerprint. The sensor incorporates a contact body that is formed, at least in part, by a light transparent elastic material. The elastic contact material may be attached to a flat sensor plate that has a light receiving surface. The sensor also incorporates a light source and a photodetector to measure the valleys and ridges of the fingerprint. The elastic nature of the contact body causes cycles of compression and flexing that again lead to the deterioration of the contact point between the sensor and the finger.

It has also been found that the current methods and structures for protecting sensors from the environment of intended use fail to address the distinct environmental exposures to which the sensors are exposed, in particular, electrostatic build-up on, e.g, human skin or any other object that may come into close proximity with or contact the sensor. Sensor protection versus sensitivity must generally be carefully balanced to achieve both an acceptable signal-to-noise ratio and adequate protection. Generally, as sensor protection increases, sensor sensitivity decreases. In the case of electrical damage to sensor surface structures or the active circuits that form part of the sensor circuitry during use, present electrostatic discharge circuitry fails to protect the sensor circuitry during an electrostatic discharge.

As sensors and users can be exposed to a wide variety of environmental conditions that can cause a great increase in electrical potential in comparison to objects that are at a different potential or grounded, it has now been found that sensors should be fitted with electrostatic discharge protection to be durable. For example, when the user approaches the sensor at a great voltage disparity, a sudden electrical discharge may cause operational failure of the sensor, such failure may be temporary or permanent.

Typical electrostatic discharge protection circuits for solid state arrays may be relatively poor, since in this type of circuit configuration, it is usual to connect the cell's buried and ungrounded capacitor plates to transistor gates and/or to connect the cell's ungrounded and buried capacitor plates to system ground potential by way of reverse biased diodes. In this type of construction and arrangement, the electrostatic charge sometimes carried by a human body and its fingertip, which may be in the range of several kilovolts (kV) or more, may be sufficiently high to break through the solid state cell's upper dielectric/passivation layer. If this breakthrough occurs, the potential is raised at ungrounded circuit nodes that are associated with the buried capacitor plates and may cause damage to the associated array cell. Damage to the data or the sensor must be avoided, while the sensitivity of the sensor is maintained at close to optimal levels.

Another significant problem of the current structures for the protection of fingerprint sensors is contamination from substances, such as oils and proteins that are found on the surface of fingers. To remove these contaminants, it is often necessary to use organic or inorganic solvents or detergents to clean the sensor surface. Therefore, the electrostatic discharge protection must be resistant to these often corrosive compounds.

Another area of concern is hygiene. Fingers, as well as the environment, tend to contain a number of microbes and bacteria that are removed from the sensor along with the other contaminants. To remove these microbes and bacteria and reduce the chance of contagion between users, antibacterial, antifungal and decontaminating agents are often used to clean the sensors. These decontaminating agents often include harsh abrasives, enzymes, organic or inorganic solvents or detergents. Therefore, any electrostatic discharge protection must be resistant to these often corrosive cleaning compounds.

What is needed is a structure and method to protect sensors from electrostatic discharges, while at the same time maintaining the sensors ability to withstand mechanical stress. The structure must not only permit continued functioning of the sensor during normal use, but also withstand, among others, the extreme conditions of humidity, electricity, heat, light, etc., to which the sensor may be exposed. The sensor electrostatic discharge structure should also be resistant to chemical detergents and solvents, but still be compatible with the underlying components of the sensor.

SUMMARY OF THE INVENTION

The present invention provides a method of and system for providing electrostatic discharge capability for a sensor circuit, such as a fingerprint sensor. In a type of sensor array with which this invention finds utility, each sensing cell includes ungrounded metal capacitor plates covered by a dielectric. An ungrounded object, such as a fingertip which comes close to or in contact with the dielectric forms a third capacitor plate between the metal capacitor plates. An electrostatic charge sometimes carried by a human body may be sufficiently high to break through the dielectric layer covering the metal capacitor plates. The present invention improves the electrostatic discharge performance of such a sensor array.

The present invention is directed to a process and apparatus for dissipating electrostatic charges including, a dielectric layer disposed over first and second conductive capacitor plates to isolate the first and second conductive plates. A conductive layer is disposed over at least a portion of the dielectric layer and disposed adjacent to or over a portion of the conductive plates. The invention may also include a protective layer disposed adjacent to or over a portion of the conductive layer.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIGS. 3 and 4 are cross-sectional views of one embodiment of a basic structure for electrostatic discharge protection according to the present invention;

FIG. 5 is a cross-sectional view of an alternative embodiment of a structure for electrostatic discharge protection according to the present invention;

FIG. 6 is a cross-sectional view of yet another alternative embodiment of a structure for electrostatic discharge protection according to the present invention; and FIG. 7 is a cross-sectional view of yet another alternative embodiment of a structure for electrostatic discharge protection according to the present invention.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of ways to make and use the invention and do not delimit the scope of the invention.

Figure 1:
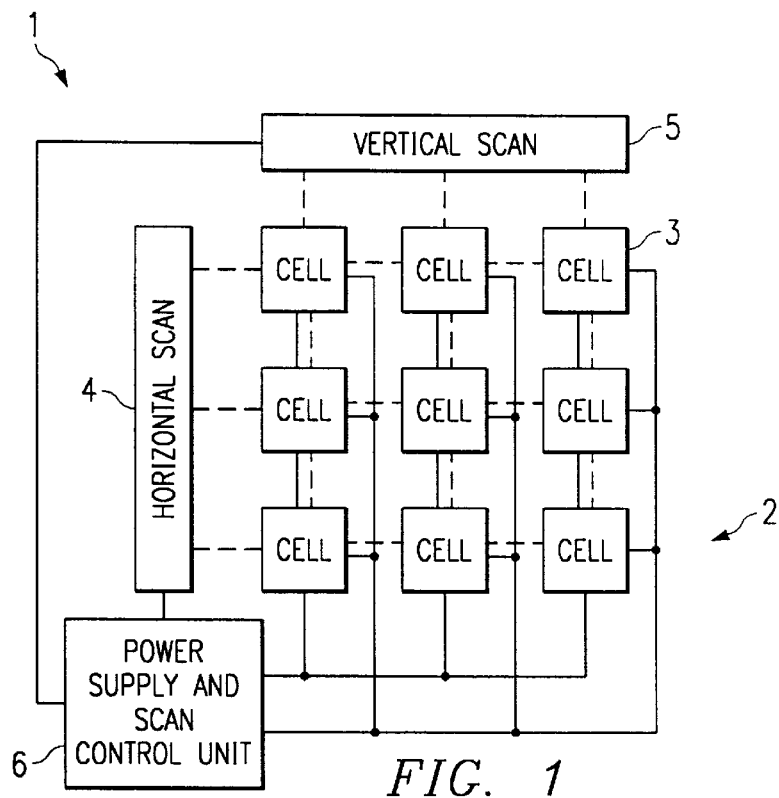
FIG. 1 is a block diagram of a sensor array according to the present invention.

By way of background, referring now to FIG. 1, there is shown a block diagram of a user input device 1. User input device 1 is preferably integrated into a single chip, and it includes an array 2 of sensors or pixel cells 3. For purposes of illustration, array 2 is shown comprising nine cells 3. In an actual device, more than nine cells would more likely be included. Each individual sensing cell 3 represents one pixel of the array 2 and is generally smaller than the width of a fingerprint ridge. Enough cells 3 are included in array 2 so that several ridges and valleys of a fingerprint may be detected. In a preferred embodiment, pixel cells 3 are on a pitch of approximately 50 $\mu$m, which corresponds to a resolution of approximately 508 dots per inch (dpi) for a fingerprint image.

Device 1 includes a horizontal scanning stage 4 and a vertical scanning stage 5. Scanning stages 4 and 5 enable detection from one cell in array 2 at a time according to a predetermined scanning pattern.

Input sensor device 1 includes a power supply and scan control unit 6. Power supply and scan control unit 6 supplies a reference voltage to each cell 3 of array 2. Power supply and scan control unit 6 also operates to scan stages 4 and 5 to produce the desired scanning of cells 3.

Figure 2:
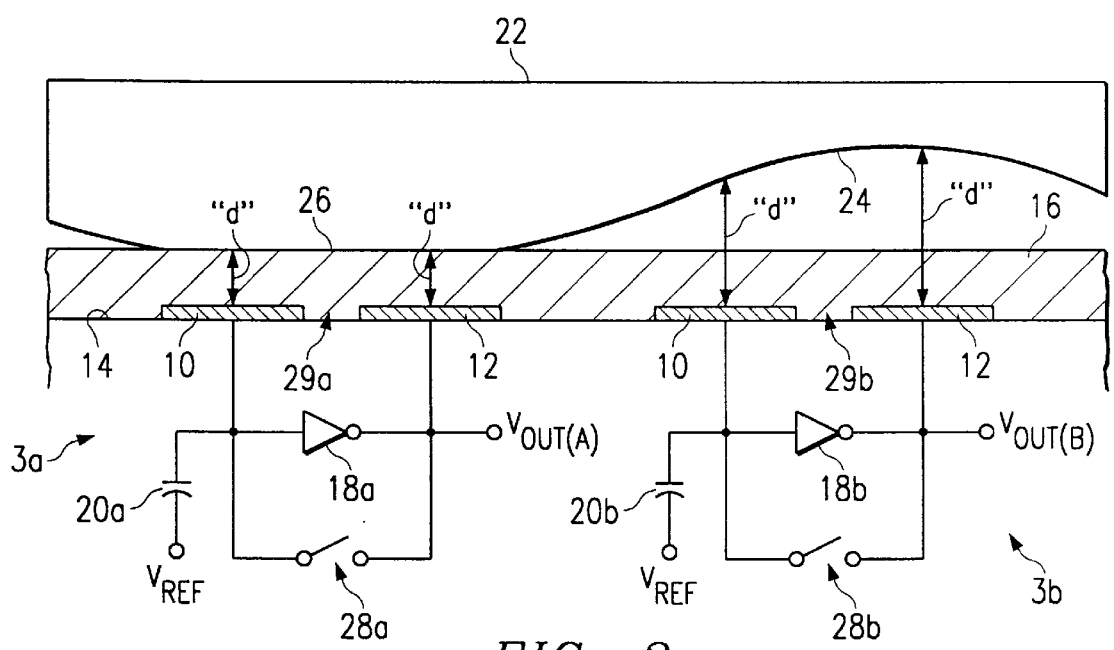
FIG. 2 illustrates the physical structure of the individual sensor cells and their electrical operation according to the present invention.

By way of further background, referring now to FIG. 2, there is illustrated the structure and operation of a cell 3. The preferred cell of the present invention is of the type disclosed in Tartagni, U.S. patent application Ser. No. 08/799,543, filed Feb. 13, 1997, titled CAPACITIVE DISTANCE SENSOR, the disclosure of which is incorporated herein by reference. The technology of the present invention utilizes an active pixel design based on a capacitive feedback sensing circuit.

Each cell 3 (3a, 3b) includes a first conductor plate 10 and a second conductor plate 12 supported on a semiconductor substrate (shown below with reference to FIG. 3), which is preferably a conventional silicon substrate that may have a shallow epitaxial layer at an upper surface region 14 of the silicon substrate. The top surface of the substrate includes an insulating layer 16. Insulating layer 16 is preferably an oxide layer, which may be a conventional thermally deposited silicon dioxide layer. Insulating layer 16 may further comprise a protective or passivation coating preferably of a hard or ultra-hard material. With an added protective coating, insulating layer 16 protects sensor 3 from abrasion, contamination, and electrostatic discharge.

Each cell 3 includes a high-gain inverting amplifier 18 (18a, 18b). The input of the amplifier 18 is connected to a reference voltage source $V_{ref}$ through an input capacitor 20 (20a, 20b). The output of each amplifier 18 is connected to an output $V_{out}$ ($V_{out}(A)$, $V_{out}(B)$). The input of each amplifier 18 is also connected to the respective conductor plate 10 and the output of each amplifier 18 is also connected to the respective conductor plate 12, thereby creating a charge integrator whose feedback capacitance is the effective capacitance between the two conductor plates 10 and 12.

When no object is placed on the surface of insulating layer 16, the effective capacitance between plates 10 and 12 is the fringing capacitance seen through layer 16 and the air near the surface of the sensor at the region 29 (29a, 29b). The distance between plates 10 and 12 at region 29 is approximately 2 microns. When an object 22, such as a finger, is placed on the surface of insulating layer 16, the conductive properties of the object (e.g., skin surface) and the proximity of the object to the sensor surface will act to modify the capacitance coupling between plates 10 and 12. The object is separated from plates 10 and 12 by a total dielectric layer that includes both the insulating layer 16 and a variable thickness of air between layer 16 and the object. Because fingerprint valleys or pores 24 will be farther from the sensor surface that finger ridges 26, sensors 3 beneath valleys or pores 24 will have more distance between their conductor plates 10 and 12 and the skin surface than sensors 3 under ridges 26. The thickness "d" of this total dielectric layer will modulate the capacitive coupling between plates 10 and 12 of each cell 3. Accordingly, sensors 3 under valleys or pores 24 will exhibit a different effective capacitance than sensors 3 under ridges 26. As shown in FIG. 2, the effective capacitance of sensor 3a is different from the effective capacitance of sensor 3b. $V_{out}(A)$ will differ from $V_{out}(B)$ since $V_{out}$ is inversely proportional to the effective feedback capacitance.

Scanning stages 4 and 5 of FIG. 1 now operate to sequentially enable the reading or interrogation of the many cells 3 within array 2. Sensors 3 work in two phases. During the first phase, the amplifier 18 is reset with a switch 28 (28a, 28b) by shorting the input and output of amplifier 18. This causes amplifier 18 to settle at its logical threshold. During the second phase, a fixed charge is input to the amplifier, causing an output voltage swing inversely proportional to the feedback capacitance, which is the effective capacitance between conductor plates 10 and 12. This effective feedback capacitance is now the capacitance between plates 10 and 12 seen across the total dielectric at a distance "d" which includes layer 16 and air between the finger 22 and the top of layer 16.

For a fixed amount of input charge, the output of amplifier 18 will range between two extremes depending on the effective feedback capacitance value. The first extreme is a saturated voltage level if the effective feedback capacitance is very small. The second extreme is a voltage close to the logical threshold, which is the reset value, when the effective feedback capacitance is large. Since the distance between the skin and the sensor changes the effective feedback capacitance of the charge integrator, the output of sensor 3a under ridge 26 will be different from the output of sensor 3b under valley 24. The entire fingerprint pattern can thus be digitized by sensing the differences in adjacent pixel cell capacitive values. It is also important to note that a conductive path to ground should be provided to or around each pixel (not shown), such that an electrostatic discharge is dissipated though the conductive path to ground rather than through the circuitry of the pixel and to ground. To be effective, such electrostatic discharge layer must present a more conductive path to ground than any paths to ground through the internal circuitry of the pixels and any dielectrics insulating the circuitry from the environment.

The structure and method of the present invention may be used with a wide variety of imaging sensors, such as the fingerprint sensor described herein by way of example, and as will be known to those skilled in the art in light of the present disclosure.

As noted above, in using the described capacitance-coupled sensor, resolutions of up to 508 dpi can be achieved. With improvements in image processing algorithms, sensors having a resolution of 750 dpi, or more, can be expected. For use in sensing fingerprint valleys and ridges, an array 2 of cells is used to sample the fingerprint pattern. The entire chip may also contain additional timing and voltage controls and references in addition to the above described controls and references.

The structure and method for dissipating the electrostatic discharge and protecting the pixel cell will now be described. Referring to FIG. 3, forming the insulating layer 16 for use with the present invention, in one embodiment, is further described. Electrostatic discharge protection relative to electrostatic potential that may be carried by an object such as an ungrounded fingertip, is provided by placing a number of conductive paths within the insulating layer 16. Each pixel cell 3, such as a capacitively coupled fingerprint sensor, is formed on a silicon substrate 13. Substrate 13 may have P-type or N-type conductivity. Substrate 13 may be made of, for example, silicon, glass, gallium arsenide, silicon on insulator (SOI) structures, epitaxial formations, germanium, germanium silicon, polysilicon, amorphous silicon, or like semi-conductive or conductive substrates. Substrate 13 is typically made of single crystal silicon, and may be lightly doped with boron, phosphorous or arsenic atoms depending upon the desired conductivity.

In FIG. 3, a cross-sectional view of insulating layer 16 and its component layers is shown. A dielectric layer 30 may be formed over conductor plates 10 and 12 and substrate 13, preferably by deposition techniques using plasma enhanced chemical vapor deposition (PECVD) to a thickness which will electrically isolate subsequent layers from conductor plates 10 and 12 and substrate 13. Dielectric layer 30 may be formed of any suitable dielectric material and thickness which ensures electrical isolation, for example, silicon dioxide or glass. The glass may contain, e.g., phosphorous or boron and phosphorous, which may serve to trap sodium ions from objects, such as the skin. The thickness of dielectric layer 30 may be varied, for example, by changing the time of deposition. Layer 30 is preferably between 6,000 and 12,000 angstroms. Alternatively, dielectric layer 30 may be a composite layer having a first dielectric layer 30' and a second dielectric layer 31, formed of compatible dielectric materials with desired dielectric constants. If a composite layer is formed, layer 30' is preferably silicon dioxide or glass and layer 31 is preferably silicon nitride. Each of these layers 30' and 31 may have a thickness between approximately 3,000 and 6,000 angstroms. Disposed over at least a portion of dielectric layer 30 is a conductive layer 32, which may be sputtered or may also be deposited, for example, by PECVD as will be more fully described below.

A passivation layer 34 may be formed, if desired, over or adjacent to conductive layer 32 and over exposed dielectric layer 31, and may also be deposited by, e.g., PECVD. The overlying passivation layer 34 may be, e.g., a hard material suitable for protecting the sensor, such as silicon carbide or a combination of silicon carbide and silicon nitride. This overlying passivation layer 34, if formed, should be thick enough to protect the sensor from abrasion and contamination yet thin enough to allow conductive layer 32 to transfer the electrostatic discharge created at the surface of layer 16 away from the active circuits of cells 3 of array 2. In a preferred embodiment, passivation layer 34 is between approximately 2,000 and 3,000 angstroms. The conductive layer 32 may be further coupled to a charge dissipation circuit (not shown), providing a conductive path to ground that is more conductive than any path paths to ground through the internal circuitry of the pixels and any dielectrics insulating the circuitry from the environment. While layer 34 is shown here as a conformal layer, it may also be etched back to form a substantially planar layer or may be formed from a material that is planar when formed, such as a spin-on-glass.

The overlying passivation layer 34 provides durability to the underlying sensor, and more particularly, to the entire insulating layer 16. The thickness, composition and location of conductive layer 32 may be varied to optimize its ability to carry the electrostatic discharge away from sensor 3 while minimizing the effect on the sensitivity of sensor 3 caused by placing conductive layer 32 between the capacitance source, e.g., a finger, and the conductor plates 10 and 12.

The thickness of the conductive layer 32 may be between approximately 500 and 15,000 angstroms depending upon the desired material. The thickness of conductive layer 32 may also be increased or decreased depending on, e.g., the desired ratio of the dielectric material to conductive material in layer 16, desired resistivity levels, shape and size of layer 16, and the like. The composition of conductive layer 32 may be formed from any suitable material for charge carrying capacity and for additional damage protection. For example, aluminum or an aluminum alloy may be formed to a thickness between approximately 5,000 and 15,000 angstroms having a resistivity of approximately 0.04 ohms per square. Alternatively, a titanium layer may be formed to a thickness between approximately 500 and 1,000 angstroms with a resistivity of approximately 10 ohms per square. Alternatively, a tungsten layer may be formed to a thickness of between approximately 4,000 and 8,000 angstroms having a resistivity of approximately 0.14 ohms per square.

The conductive material chosen should have a sheet resistance low enough to allow the electrostatic charge to dissipate through this layer to prevent the electrostatic charge from reaching conductor plates 10 and 12. The materials used for each of layers 30, 32 and 34 in layer 16 should be chosen to minimize adhesion problems between the layers which could detrimentally affect the underlying sensor performance.

The conductive layer 32 may be deposited using the same equipment that is presently used to create the insulating layer 16 for use with, e.g., a fingerprint sensor. Thus, the present invention presents additional advantages in cost and efficiency in manufacturing. By using the current PECVD equipment, the entire layer 16 may be deposited at relatively low temperatures, e.g., 300 degrees Celsius or less.

In one embodiment for forming conductive layer 32, by way of example, a titanium layer is initially blanket deposited followed by forming titanium nitride over the titanium. Next, tungsten is formed over the titanium nitride to form a composite conductive layer 32.

Referring to FIG. 4, in addition, in a preferred embodiment, a photoresist (not shown) is formed and patterned to form an opening 36 in passivation layer 34 exposing selected portions or regions of conductive layer 32 overlying conductor plates 10 and 12. The exposed layer 32 in opening 36 is then etched exposing dielectric layer 30 in the regions overlying conductor plates 10 and 12 of individual cells 3 as shown in FIG. 5. Alternatively, conductive layer 32 may be formed only over the selected regions of the dielectric layer 31 using a patterned photoresist followed by, e.g., deposition or sputtering of the desired material. In one embodiment, it is preferable to remove conductive layer 32 over substantially all of conductor plates 10 and 12 to maximize the sensitivity of sensor cell 3.

Yet another embodiment of the present invention is illustrated in which the overlying passivation layer 34 having opening 36 exposes a region of conductive layer 32 overlying conductor plates 10 and 12. Forming an opening 36 in passivation layer 34 without etching conductive layer 32 as shown in FIG. 4, allows the object, such as a finger, to directly contact conductive layer 32 thereby enhancing the conductive layer's ability to dissipate any electrostatic discharge which may occur when a finger comes into close proximity with conductive layer 32 overlying capacitor plates 10, 12 of sensor 3. However, if conductive layer 32 is retained over a portion of or all of conductor plates 10, 12, the sensitivity of the sensor cell 3 diminishes.

Referring now to FIG. 5, an alternative embodiment is shown in which passivation layer 34 is patterned and etched in the same pattern as conductive layer 32, thus forming opening 36 in which dielectric layer 30 is exposed over conductive plates 10 and 12. In this embodiment, the sensitivity of sensor 3 in enhanced, while a possible decrease in the electrostatic discharge protection occurs since the object, such as an ungrounded finger, will come into close proximity with or contact conductive layer 32 only along the sides of opening 36. Damage protection to the sensor circuit may also be decreased with the passivation layer 34 removed from the regions overlying conductive plates 10 and 12.

Referring now to FIG. 6, an alternative embodiment is shown in which passivation layer 34 is formed over a previously patterned conductive layer 32 and exposed dielectric layer 30 in opening 36. Passivation layer 34 may be formed of any suitable material that provides mechanical protection to sensor 3 and adheres to the underlying layers. In addition, overlying passivation layer 34 may be formed of a material which is partially conductive to enhance the electrostatic discharge dissipation characteristices of the device according to the present invention while still retaining some or most of the sensitivity of sensor 1. In one embodiment, passivation layer 34 is formed from at least partially silicon carbide, thereby providing better mechanical protection than silicon dioxide or silicon nitride. Passivation layer 34, however, may combine a variety of silicon-based layers as well as other forms of mechanical and environmental protective materials.

In this embodiment in which passivation layer 34 overlies conductive layer 32 and dielectric layer 30 in opening 36, the sensitivity of sensor 3 is maximized while still providing for electrostatic discharge protection through layer 32. As an object, such as an ungrounded finger, touches the passivation layer, the object comes into close proximity with both the conductive layer 32 and dielectric layer 30.

Referring now to FIG. 7, an alternative embodiment is shown in which passivation layer 34 is formed substantially planar with conductive layer 32; layer 32 being disposed at least partially over conductor plates 10 and 12. In one embodiment, subsequent to the formation of dielectric layer 30, passivation layer 34 is formed. Passivation layer 34 is patterned and etched to form openings 38 exposing a portion of dielectric layer 30 overlying all or at least a portion of conductor plates 10 and 12. Conductive layer 32 is then formed over passivation layer 34, patterned and etched to form conductive regions 32' in openings 38 substantially planar with passivation layer 34. Conductive regions 32' overlie at least a portion of conductor plates 10 and 12 as shown in FIG. 7 and provide for electrostatic discharge protection as a fingertip comes into contact with the top surface of layer 16.

Alternatively, conductive regions 32' may be formed before passivation layer 34 is formed, then patterned and etched overlying dielectric layer 30 at regions overlying conductor plates 10 and 12. In this embodiment, passivation layer 34 may then be formed and etched back substantially planar with conductive regions 32' as shown in FIG. 7. The optimal pattern of layers and/or sequence of forming each of the desired layers is one in which the sensor circuitry is adequately protected from damage while the electrostatic discharge is dissipated through conductive layer 32 or conductive regions 32' and not conductor plates 10, 12; while also maximizing the sensitivity of cell 3.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A portion of an integrated circuit, comprising:
   a plurality of conductive plates which form capacitors with an object placed on a sensing surface proximate to the conductive plates for capacitive sensing of features of the object; and
   a composite protection layer that isolates the conductive plates and protects the conductive plates from damage, wherein the composite protection layer comprises:
      an insulating layer between and over the plurality of conductive plates; and
      a conductive electrostatic discharge region overlying at least a portion of dielectric region,
   wherein at least a portion of the protective layer includes an opening therethrough over at least one of the conductive plates.

2. The integrated circuit portion of claim 1, wherein the insulating layer further comprises a passivation layer to further protect the conductive plates from damage.

3. The integrated circuit portion of claim 2, wherein the conductive electrostatic discharge region includes an opening therethrough over at least some of the conductive plates.

4. The integrated circuit portion of claim 3, further comprising:
   a passivation layer over the composite protection layer, the passivation layer having an opening therethrough coinciding with the opening through the conductive electrostatic discharge region.

5. The integrated circuit portion of claim 3, further comprising:
   a passivation layer over the composite protection layer and within the opening through the conductive electrostatic discharge region.

6. The integrated circuit portion of claim 2, wherein the dielectric layer comprises a first dielectric layer of oxide or doped glass disposed under a second dielectric layer of nitride.

7. The integrated circuit portion of claim 2, further comprising:
   a passivation layer of silicon carbide or silicon nitride disposed over at least a portion of the composite protection layer.

8. A portion of an integrated circuit, comprising:
   a dielectric layer over a plurality of conductive plates which form capacitors with an object placed on a sensing surface proximate to the conductive plates for capacitive sensing of features of the object, the dielectric layer isolating the conductive plates; and
   a conductive layer disposed over at least a portion of the dielectric layer and disposed over or adjacent to one or more conductive plates, wherein the conductive layer dissipates an electrostatic charge in a manner that prevents the electrostatic charge from reaching the plurality of conductive plates and wherein the conductive layer includes an opening therethrough over at least one of the conductive plates.

9. The integrated circuit portion of claim 8, further comprising:
   a passivation layer disposed over at least a portion of the dielectric layer.

10. The integrated circuit portion of claim 9, wherein the conductive layer is disposed over substantially all of the dielectric layer, and wherein the passivation layer is disposed over substantially all of the conductive layer.

11. The integrated circuit portion of claim 9, wherein the conductive layer is disposed over substantially all of the dielectric layer, and wherein the passivation layer is disposed over a portion of the conductive layer adjacent to the conductive plates.

12. The integrated circuit portion of claim 9, wherein the conductive layer is disposed over a portion of the dielectric layer adjacent to the conductive plates, and wherein the passivation layer is disposed over the conductive layer.

13. The integrated circuit portion of claim 9, wherein the conductive layer is disposed over a portion of the dielectric layer adjacent to the conductive plates, and wherein the passivation layer is disposed over the conductive layer and over the dielectric layer not covered by the conductive layer.

14. The integrated circuit portion of claim 9, wherein the passivation layer is disposed over the dielectric layer adjacent to the conductive plates, and wherein the conductive layer is disposed over the dielectric layer substantially over the conductive plates.

15. The integrated circuit portion of claim 14, wherein the conductive layer and passivation layer are substantially planar.

16. The integrated circuit portion of claim 9, wherein every 2 of the plurality of the conductive plates forms a capacitive sensor and wherein the conductive layer is only disposed over at least a portion of 1 of every 2 conductive plates of the capacitive sensor and is adjacent to the other conductive plate of the capacitive sensor.

17. A device, comprising:
   a plurality of conductive plates, each pair of conductive plates forming a capacitor with an object when the object is placed on a sensing surface proximate to the conductive plates for capacitive sensing of features of the object, a dielectric layer over the conductive plates, the dielectric layer isolating the conductive plates;

a passivation layer over the dielectric layer, the passivation layer having openings therethrough over the conductive plates; and electrostatic discharge regions over the conductive plates at least within the openings through the passivation layer.

18. The device of claim 17, wherein the dielectric layer comprises a first dielectric layer of oxide or doped glass disposed under a second dielectric layer of nitride.

19. The device of claim 17, wherein the passivation layer comprises silicon carbide or silicon nitride.

20. The device of claim 17, wherein the passivation layer has opening therethrough only over one of each pair of conductive plates forming a capacitive sensor.

* * * * *